UNITED STATES PATENT OFFICE.

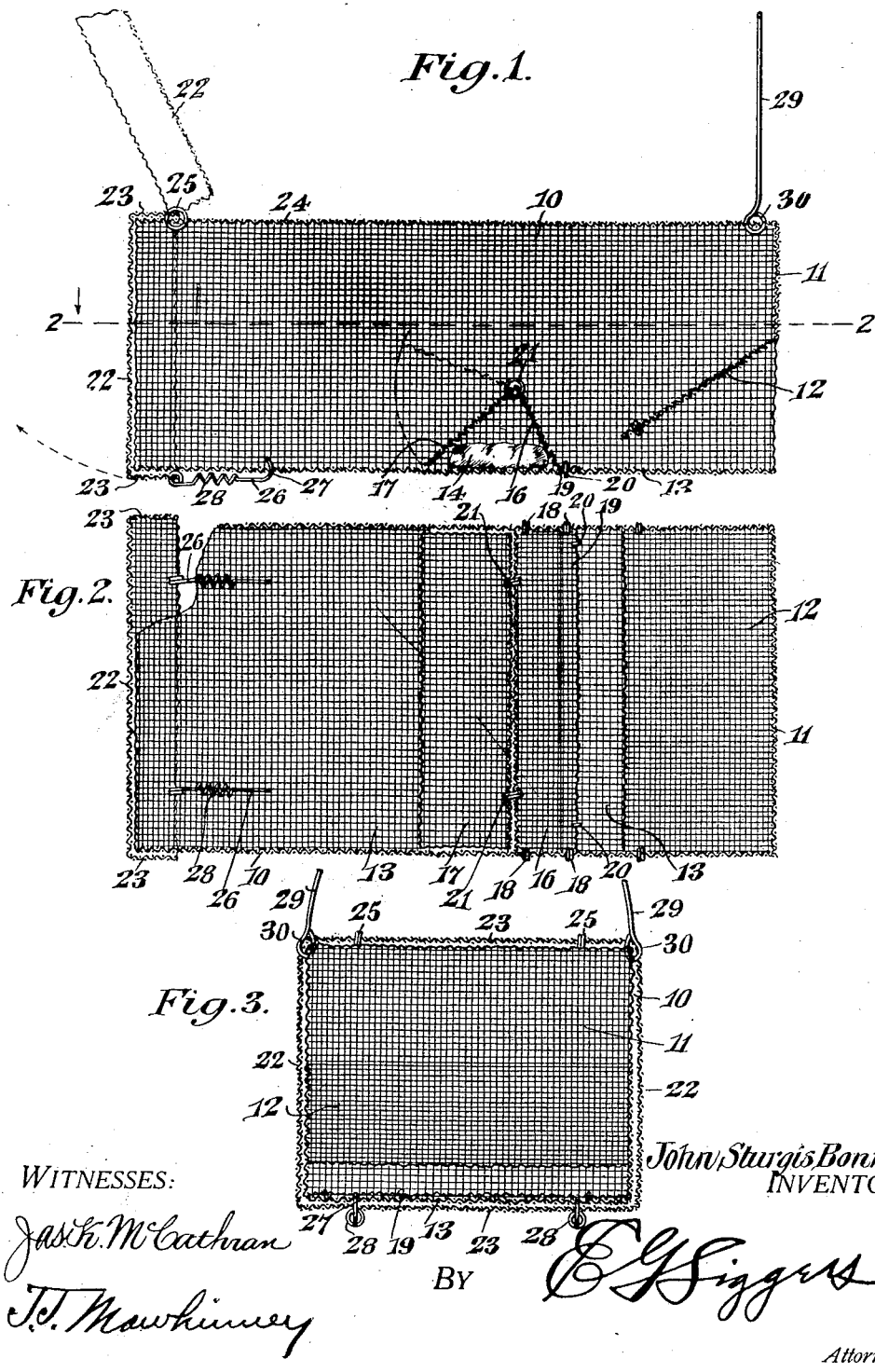

JOHN STURGIS BONNER, OF AUSTIN, TEXAS, ASSIGNOR OF ONE-HALF TO JAMES ALBERT MILLER, OF AUSTIN, TEXAS.

MINNOW-TRAP.

1,196,074. Specification of Letters Patent. Patented Aug. 29, 1916.

Application filed January 11, 1916. Serial No. 71,546.

*To all whom it may concern:*

Be it known that I, JOHN STURGIS BONNER, a citizen of the United States, residing at Austin, in the county of Travis and State of Texas, have invented a new and useful Minnow-Trap, of which the following is a specification.

The present invention has reference to an improvement in traps for minnows, small fish, and the like, and has for an object to provide a trap comprising but few parts, which is provided with a relatively broad horizontal opening or mouth at one end of the trap, and adjacent the bottom thereof, so that minnows and small fish will not be frightened when they come in contact with the mouth of the trap, and to provide a trap, the bait within which is always within full view, a trap which has the entrance at the bottom thereof, so that the minnows, or other fish, entering the trap will be held therein, as it is well known that minnows always rise when attempting to leave an inclosure, and the minnows will, therefore, be held prisoners in the top of the trap.

Another object of this invention is to provide a trap of this nature with a bait chamber or compartment to which access may be readily gained by opening a hinged panel, and to so construct and position the bait chamber in the trap that the minnows may be taken from the trap, and the trap handled, without disturbing the bait or losing it.

Other objects and advantages of this invention will be brought out in the following detail description of the present preferred embodiment of the invention, the same being disclosed in the accompanying drawing, wherein:

Figure 1 is a longitudinal vertical section, taken centrally through the improved minnow trap, the dotted lines at the left end of the figure showing the end closure open, so that access may be had to the interior of the trap for removing the minnows. Fig. 2 is a horizontal longitudinal section, taken on the line 2—2 of Fig. 1, looking downwardly in the direction of the arrow indicated. Fig. 3 is a front end view of the trap, showing the broad horizontal entrance, near the bottom of the trap, and showing the edge of the hinged closure on the opposite or rear end of the trap.

Referring to this drawing, it will be noted that the body 10 of the trap is made entirely of wire meshing, which is relatively fine, so as to retain minnows and other small fish in the trap when caught. The body 10 is provided with a front wall 11 extending vertically downward substantially half the height of the front of the trap and terminating at its lower end in an inwardly and downwardly extending wall 12 forming the top of of the mouth of the trap, and terminating at its inner end in spaced relation to the bottom 13 of the trap. The space between the lower end of the wall 12 and the bottom 13 is sufficient only to receive the minnows therethrough as they endeavor to obtain the bait 14 arranged on the bottom 13 directly beyond the mouth of the trap. The mouth of the trap is formed by the wall 12, the bottom 13, and the sides of the body 10, as will be clearly understood from the drawings. The bait chamber is made up of a pair of sections 16 and 17. The section 16 is inclined upwardly and obliquely, being inclined from the vertical toward the rear of the trap and extending entirely across the interior of the trap, the ends of the section 16 being secured by eyes 18, or the like, to the sides of the body 10, the eyes being looped through the interstices of the body and the section 16. It will be noted that the lower edge of the section 16 is flanged as at 19, which flange rests flat across the bottom 13, and is suitably secured thereto by eyes 20, or the like. To the upper end of the section 16 is hinged the inner edge of the section 17, the section 17 being supported upon rings 21. which engage through the adjacent edges of the sections 16 and 17 to admit of the swinging upwardly of the section 17, as shown in dotted lines in Fig. 1, and to permit access to the bait chamber which is formed beneath the sections 16 and 17. The section 17 is of such width, or length measured outwardly from the rings 21, that the outer free edge of the section 17 rests upon the bottom 13 at a point spaced considerably from the flange 19 of the fixed section, so as to provide a substantially inverted V-shaped chamber for the reception of the bait 14.

The rear of the trap is provided with a removable closure 22 in the form of a flanged cover, the flange of which engages entirely around the body 10, so as to effectively close the rear end of the body and prevent the formation of openings or crevices between the cover and the body. This flange, designated as 23, is connected to the top 24 of the body by hinge rings 25, which pass through the flange 23 and the top 24, so as to connect the same together and admit of the swinging outwardly and upwardly of the closure 22 into the dotted line position shown in Fig. 1. When the cover is thus opened, the minnows may be easily withdrawn from the body 10 for use as bait. The free side of the flange 23 is provided with a spring hook 26, the bill 27 of which is adapted for engagement in any one of the openings in the meshed bottom 13 of the body 10. In this manner, the closure 22 is held right against the rear end of the body, as the spring 28, which is of coiled form, exerts a yielding pressure upon the cover to hold it in place.

For the purpose of supporting the body 10 in the water, and otherwise handling the same, a bail 29 is employed which is secured to the forward end of the body by eyes 30 on the ends of the bail, which pass through the meshes of the body and support the bail hingedly at the upper forward corners of the body. It is, of course, understood that one or more of these bails 29 may be employed, and the bails may be placed at any convenient part of the body 10.

When it is desired to use the trap, the spring hooks 26 are released from the bottom 13, preferably two of these hooks being used to secure the opposite sides of the closure 23 from swinging outwardly, and the closure is swung upwardly about the hinge rings 25, into the position shown in dotted lines in Fig. 1. The section 17 is now swung upwardly to open the bait chamber or compartment, and the bait 14 is placed therein, flat on the bottom 13. The section 17 is permitted to drop back into closed position, as shown in full lines in the drawings. If, desired, the section 17 may be secured in closed position in any suitable manner, as by means of the eyes, which are used in conjunction with the section 16. Thus, the bait 15 is located directly on the bottom of the trap and in direct line with the mouth of the trap, so that as the minnows enter the mouth, the bait is always in sight, and is an incentive for them to enter through the passage beneath the inclined wall 12. As soon as the minnows enter the mouth of the trap, they are guided upwardly by the inclined wall or section 16, and as they always seek to rise, they will not find the passage beneath the wall 12, but will be trapped in the upper end of the body 10. The inclined wall or section 17 also performs the function of directing the minnows upwardly should they attempt to travel along the bottom of the trap to thus prevent them from passing out beneath the wall 12. The body 10 may be placed on the bottom of a shallow stream with the throat or entrance of the trap pointing down stream, or the trap may be supported by means of the bail 29 in one or two feet of water, so as to attract the minnows or small fish and retain the trap upright in the position shown in Fig. 1.

The inverted V-shaped bait holder is placed on the bottom 13 in slightly spaced relation from the mouth of the trap for the purpose of holding the bait in the most advantageous place, and in constant view of the minnows as they work into the mouth of the trap, and also for the purpose of providing deflecting walls operating to direct the minnows upwardly in the trap as they enter the same and when they make any attempt to leave the trap.

It is, of course, understood that the above specifically described embodiment of this invention may be modified or changed to accommodate the trap to various usages, and to various designs, within the scope of the claims, without departing from the spirit of the invention.

What is claimed is:—

1. A trap comprising a wire meshed body having an entrance opening at one end adjacent the bottom of the body and extending transversely across the same, a closure hinged upon the opposite end of the body and adapted to be swung outwardly to gain access to the interior of the body, and a pair of bait retaining sections supported upon the bottom within the body in spaced relation to said entrance opening.

2. A minnow trap having a relatively broad inwardly contracting entrance opening, and an inverted V-shaped bait chamber mounted in the trap in slightly spaced relation from the entrance opening to deflect the minnows upwardly in the trap when passing into the trap and also when approaching the entrance opening from the inside of the trap.

3. A minnow trap having an inwardly contracting mouth in one end and at the bottom of the trap, said mouth extending across the entire width of the trap, a deflecting wall rising at a rearward inclination from the bottom in slightly spaced relation inwardly from the mouth, and a second deflecting wall hinged to the top of the first wall and normally extending downwardly and inwardly to deflect minnows upwardly in the trap as they approach the mouth from the inside of the trap, said second deflecting wall being hinged to admit the positioning of bait thereunder and beneath said first deflecting wall.

4. A minnow trap comprising an elongated body having a flat bottom, an inwardly contracting entrance opening at one end of the body and extending transversely across the same, a bait holder having inner and outer inclined walls mounted on the bottom in said body in spaced relation inwardly from said mouth to deflect minnows, entering the trap and approaching the inlet from inside the trap, into the top of the trap, a hinged closure on the opposite end of said body, and a spring hook secured to the free end of the closure and adapted for yielding engagement in the body to hold the closure from opening.

5. A minnow trap comprising a wire meshed body having an inwardly and downwardly inclined wall at its outer end terminating short of the bottom of the body to provide a relatively broad transverse entrance opening at the bottom of the body, a bait chamber secured in the bottom of the body in spaced relation from the entrance opening and having inner and outer walls inclining upwardly and toward each other, the outer wall to deflect minnows from the entrance opening upwardly into the body and the inner wall to deflect minnows upwardly into the body as they approach the entrance opening from the inside of the trap, a hinged closure on the opposite end of the trap, and a pair of spring hooks carried by the closure and adapted to be extended and engaged in the wire meshed bottom of the trap to securely hold the closure from swinging outwardly.

6. A minnow trap comprising a wire meshed body having a relatively broad entrance opening at one end and at the bottom of the body, a bait chamber mounted in the body on the bottom thereof in spaced relation from the entrance opening to deflect minnows upwardly into the trap and to hold the bait in line with the entrance opening, a hinged closure on the opposite end of the body, a pair of hooks having coiled springs in their lengths hinged to the closure and adapted to be stretched for binding engagement in the meshed bottom of the body to hold the closure from opening, and a bail provided with eyes at its opposite ends looped through the meshed body at the upper forward end thereof to support the body.

7. A minnow trap comprising a transparent body having an entrance opening at one end, and a bait holder arranged in spaced relation to and in alinement with the entrance opening and being in constant view of the minnows approaching the said opening, the bait holder also providing a deflecting member directing the minnows upwardly in the trap when passing into and when attempting to pass out of the trap.

In testimony, that I claim the foregoing as my own, I have hereto affixed my signature in the presence of two witnesses.

JOHN STURGIS BONNER.

Witnesses:
W. L. HUERNIANN,
A. J. POSEY.